US 6,694,485 B1

(12) United States Patent
Kelley et al.

(10) Patent No.: US 6,694,485 B1
(45) Date of Patent: Feb. 17, 2004

(54) ENHANCED VIEWING OF HYPERTEXT MARKUP LANGUAGE FILE

(75) Inventors: Edward E. Kelley, Wappingers Falls, NY (US); Norman J. Dauerer, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/362,173

(22) Filed: Jul. 27, 1999

(51) Int. Cl.7 .............................................. G06F 15/00
(52) U.S. Cl. .................... 715/525; 715/513; 715/501.1; 715/500.1
(58) Field of Search ......................... 707/525; 715/525, 715/513, 501.1, 500.1

(56) References Cited

U.S. PATENT DOCUMENTS

| | | | | |
|---|---|---|---|---|
| 4,709,348 A | * | 11/1987 | Horn et al. .................. 707/525 |
| 4,873,514 A | * | 10/1989 | Nakagawa et al. ........... 345/26 |
| 5,038,138 A | * | 8/1991 | Akiyama et al. ........... 345/684 |
| 5,263,134 A | * | 11/1993 | Paal et al. .................. 345/788 |
| 5,517,605 A | | 5/1996 | Wolf |
| 5,634,064 A | * | 5/1997 | Warnock et al. ............ 707/513 |
| 5,701,498 A | | 12/1997 | Goach, Jr. et al. |
| 6,175,845 B1 | * | 1/2001 | Smith et al. ................. 707/525 |
| 6,389,437 B2 | * | 5/2002 | Stoub ......................... 707/523 |

* cited by examiner

Primary Examiner—Stephen S. Hong
Assistant Examiner—Adam Queler
(74) Attorney, Agent, or Firm—DeLio & Peterson, LLC; Kelly M. Reynolds; Ira D. Blecker (57) ABSTRACT

The present invention discloses a method and apparatus for correctly positioning the text of a hypertext markup language (html) file on a display screen linked to a computer such that there are no partial lines of text displayed and without the re-display of text that was displayed on a previous screen. By correctly positioning the text on the display screen, even when the user scrolls the text backwards and forwards, only entire lines of text are displayed which makes reading the text on the screen much more user friendly. By locating the html tags within the html source file, the number of lines of text in the file are determined and subsequently assigned to a screen row within the display screen such that only entire lines of text are displayable.

27 Claims, 8 Drawing Sheets

FIG. 1
PRIOR ART

Clinton spoke about school safety and crime, announcing initiatives that included a guide to how to deal with and prevent school violence and the expansion of a scholarship program to encourage young people to train as police officers.

Clintoc said he visited the school in Springfield, Oregon, where 15-year-old Kipland "Kip" Kinkel was charged with killing two students and his parents and wounding 24 people in May.

"We concluded that not everybody knew what they needed to know in clear, practical terms about what the danger signals were and how to catch them early," Clinton said.

"These are the things that people are interested in," Kennedy said afterward.

But Clinton's appearance was clearly meant as an attempt to reconnect with the public. At his side as he arrived in Worcester was Hollywood producer Mort Engelberg, who has often advised Clinton on his public appearances.

Clinton confessed in a televised speech Aug. 17 that he had misled the public and his family about a relationship with Lewinsky that he acknowledged was "not appropriate."

He has since been keeping close to his borrowed vacation home, where aides say he has been working on repairing his marriage and regaining his political footing.

Clinton did not mention the scandal in his speech, and got plenty of help for his foray into the public eye.

A cheering crowd filled the city's Mechanics Hall, a restored auditorium that holds about 1,800 people. Clinton won 60 percent of the vote in Massachusetts' Third District, where Worcester is located, in the 1996 election.

"This is not a city of fair-weather friends," McGovern said in his speech greeting Clinton.

"You, Mr. President with your policies, have been a true friend to Worcester," McGovern added. "I have never seen a president work harder for this country."

Make YAHOO ! Your Homepage!

Index | Top Stories | Business | Tech | Politics | World | Health | Entertainment | Sports | Local Top Stories Headlines Yahoo! News Thursday August 27 2:13 PM EDT

Clinton aims to steer agenda away from scandal

By Randall Mikkelsen

WORCESTER, Mass. (Reuters) — President Clinton Thursday emerged from near-seclusion to try to shift attention to public policy, away from the scandal of what he called an inappropriate relationship with young former White House intern, Monica Lewinsky.

Clinton chose a friendly audience for his first big public appearance since he admitted his afffair with the young former White House intern, flying to Worchester, a strongly Democratic city in one of the most Democratic states in the country.

He was invited by Massachusetts Democrat Jim McGovern and greeted onstage by the state's two Democratic senators, Edward Kennedy and John Kerry, as well as three other Democratic Congressmen —Joseph Moakley, Richard Neal and Edward Markey.

Squealing schoolchildren met Clinton as he arrived in Worchester by jet from Martha's Vineyard, where he has been spending an uncharacteristically low-key vacation with his family at a friend's secluded estate.

Clinton spoke about school safety and crime; announcing initiatives that included a guide to how to deal

FIG. 3A with and prevent school violence and the expansion of a scholarship program to encourage young people to train as police officers.

Clinton said he visited the school in Springfield, Oregon, where 15-year-old Kipland "Kip" Kinkel was charged with killing two students and his parents and wounding 24 people in May.

"We concluded that not everybody knew what they needed to know in clear, practical terms about what the danger signals were and how to catch them early," Clinton said.

"These are the things that people are interested in," Kennedy said afterward.

But Clinton's appearance was clearly meant as an attempt to reconnect with the public. At his side as he arrived in Worcester was Hollywood producer Mort Engelberg, who has often advised Clinton on his public appearances.

Clinton confessed in a televised speech Aug. 17 that he had misled the public and his family about o relationship with Lewinsky that he acknowledged was "not appropriate."

He has since been keeping close to his borrowed vacation home, where aides say he has been working on repairing his marriage and regaining his political footing.

Clinton did not mention the scandal in his speech, and got plenty of help for his foray into the public eye.

A cheering crowd filled the city's Mechanics Hall, a restored auditorium that holds about 1,800 people. Clinton won 60 percent of the vote in Massachusetts' Third District, where Worcester is located, in the 1996 election.

"This is not a city of fair-weather friends," McGovern said in his speech greeting Clinton.

"You, Mr. President with your policies, have been a true friend to Worcester," McGovern added. "I have never seen a president work harder for this country."

| Absolute Row Number | Screen Row Number |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | 22 |
| 23 | 23 |
| 24 | 24 |
| 25 | 1 |
| 26 | 2 |
| 27 | 3 |
| 28 | 4 |
| 29 | 5 |
| 30 | 6 |
| 31 | 7 |
| 32 | 8 |
| 33 | 9 |
| 34 | 10 |
| 35 | 11 |
| 36 | 12 |
| 37 | 13 |
| 38 | 14 |

ENHANCED VIEWING OF HYPERTEXT MARKUP LANGUAGE FILE

BACKGROUND OF THE INVENTION

1. Field of the Invention

The present invention relates to web page control and, more specifically, to methods and apparatus for viewing the text in a hypertext markup language (html) file such that the text is formatted to be displayed in a reader-friendly environment.

2. Description of Related Art

With the advent of the Internet and the World Wide Web as common everyday useful tools of research and recreation, the web browser is an essential piece of software on every computer or network. The web browser accesses the Internet server and allows the user to view web sites or web pages which are written in hypertext markup language (html). This html source file typically contains only text and sometimes graphics files are also incorporated therein. The html source files are typically written with html tags incorporated into the source file which are utilized by the web browser to format the source file into the html file displayed on the computer screen.

When using a current web browser to view an html file that contains text, only a portion of the text in the lines at the top and/or the bottom is displayed by the web browser due to its positioning on the screen. The partial display of text makes reading the text file on the screen cumbersome. Depending on how the text is arranged in the file, backward or forward scrolling of the file will again result in the problem of having the web browser display only a portion of a line at the top and or bottom of the screen. The text which is partially displayed may then reappear in its entirety when the user scrolls backward or forward only to have another line of text be partially displayed.

Figure 1:
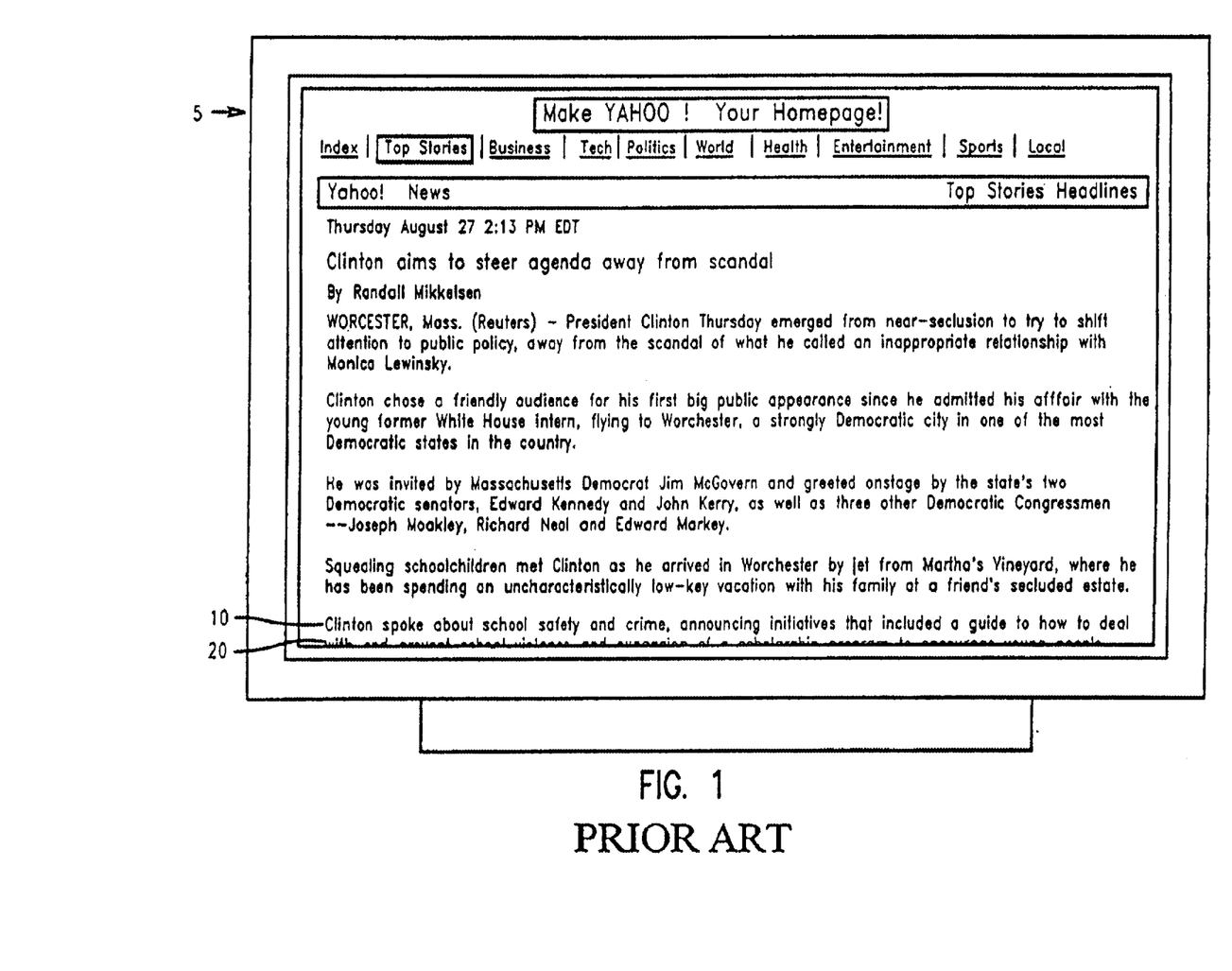
FIG. 1 is an illustration of a display screen linked to a computer displaying an html file containing text as viewed by a prior art web browser.

FIG. 1 illustrates a display screen 5 linked to a computer on which a current web browser has accessed and displayed the beginning of an html file containing text. Towards the bottom of display screen 5, the last line of text which is entirely displayed is denoted by numeral 10. However, the current browser also partially displays the following line of text 20. As the user scrolls forward to read the subsequent text, FIG. 2 illustrates the display screen following the scroll forward command. Although the partially displayed line of text 20 is now viewed in its entirety as line 40, the preceding line 10, which was fully displayed by the web browser previously, is also displayed again as line 30.

If the text is scrolled forward again for the user to view the remaining text of the html file, there will again be partially displayed lines of text and re-displayed lines of text in the same fashion. Scrolling the text backward results in the same condition but in the opposite condition. This may be compared to reading a book that has text at the top and bottom of the page occasionally bisected horizontally because the printer was unable to adequately position the text on each page. Thus, it is desirable to provide a web browser which adequately positions the html file so that partial lines of text are not displayed and re-displayed when scrolling the file such that reading the text on the display screen is less cumbersome.

Bearing in mind the problems and deficiencies of the prior art, it is therefore an object of the present invention to provide a method and apparatus for formatting html files for viewing on a display screen linked to a computer.

It is another object of the present invention to provide a method and apparatus for accessing and viewing an html file wherein scrolling the file backward or forward does not result in partial displays of lines of text and re-display of lines of text.

A further object of the invention is to provide an enhanced web browser for accessing and viewing web pages comprising html files containing text.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of viewing a hypertext markup language file containing text comprising the steps of: (a) providing a computer linked to a display screen with an adjustable number of screen rows for displaying lines of text on the screen; (b) accessing a hypertext markup language file containing lines of text; (c) determining a total number of lines of text in the file; and (d) viewing a portion of the total number of lines of text in the file, the portion having lines of text assigned to the screen rows of the screen such that only entire lines of text are displayed on the screen.

The method may further include, after step (b), the steps of creating a reserve table, the reserve table adapted to contain the number of screen rows and the total number of lines of text in the file; assigning the lines of text in the file to the screen rows; and writing the number of lines of text in the file to the reserve table to correspond to the screen rows. And further including, after step (d), the steps of reading the reserved table to determine which of the lines of text in the file corresponding to the screen rows is to be viewed on the screen; and writing the lines of text determined from the reserve table to the screen rows for viewing.

Wherein the user proceeds to forward scroll the file, the method further includes the steps of determining the number of lines of text scrolled forward; determining the number of lines of text scrolled forward to be written to the screen; assigning the lines of text to the screen rows; and writing the lines of text to the screen such that only entire lines of text are displayed on the screen.

Wherein the user proceeds to backward scroll the file, the method further includes the steps of determining the number of lines of text scrolled backward; determining the number of lines of text scrolled backward to be written to the screen; assigning the lines of text to the screen rows; and writing the lines of text to the screen such that only entire lines of text are displayed on the screen.

Preferably, step (c) comprises determining a total number of lines of text in the file by locating hypertext markup language tags in the file, the tags indicating a beginning and an end of the file.

In another aspect, the present invention is directed to a method of viewing a hypertext markup language file containing text comprising the steps of: (a) providing a computer linked to a display screen having an adjustable number of screen rows for displaying lines of text; (b) accessing a hypertext markup language file for viewing on the screen; (c) creating a reserve table, the reserve table having the number of screen rows written thereon; (d) formatting the file by locating hypertext markup language tags within the file to determine the number of lines of text in the file; (e) writing the number of lines of text in the file to the reserve table; (f) assigning, within the reserve table, the lines of text in the file to the screen rows; (g) reading the reserved table to determine which of the lines of text in the file is to be viewed on the screen; (h) writing the lines of text assigned to the screen rows to the screen; and (i) displaying only entire lines of text on the screen. Preferably, during step (i), partial lines of text are non-displayable on the screen.

The method may further include the steps of forward scrolling the file; determining the number of lines of text scrolled forward; determining the number of lines of text scrolled forward to be written to the screen; assigning the lines of text to the screen rows; and writing the lines of text to the screen such that only entire lines of text are displayed.

The method may further include the steps of backward scrolling the file; determining the number of lines of text scrolled backward; determining the number of lines of text scrolled backward to be written to the screen; assigning the lines of text to the screen rows; and writing the lines of text to the screen such that only entire lines of text are displayed.

In yet another aspect, the present invention is directed to a method of browsing a web site comprising the steps of: (a) providing a web browser linked to a display screen having an adjustable number of screen rows; (b) engaging the web browser and accessing a web site; (c) accessing a hypertext markup language file on the web site; (d) assigning absolute row numbers to the file, the row numbers corresponding to the lines of text within the file; and (e) displaying the absolute row numbers which correspond to the screen rows on the display screen such that only entire lines of text are displayed.

The method may further include, prior to step (d), the steps of creating a reserve table, the reserve table adapted to contain the absolute row numbers and the screen rows; assigning the absolute screen numbers to the screen rows; and writing the absolute row numbers to the reserve table which correspond to the screen rows. Preferably, the step prior to step (e) comprises reading the reserve table to determine the lines of text in the hypertext markup language file to be displayed on the display screen.

The method may further include the steps of forward scrolling the file; determining the number of lines of text scrolled forward; determining the number of lines of text scrolled forward to be written to the screen; assigning the lines of text to the screen rows; and writing the lines of text to the screen such that only entire lines of text are displayed.

The method may further include the steps of backward scrolling the file; determining the number of lines of text scrolled backward; determining the number of lines of text scrolled backward to be written to the screen; assigning the lines of text to the screen rows; and writing the lines of text to the screen such that only entire lines of text are displayed.

In still yet another aspect, the present invention is directed to a method of creating and utilizing a reserve table comprising the steps of: (a) providing a computer with a display screen having a number of screen rows, the computer having access to a hypertext markup language file; (b) selecting the file for display on the screen; (c) creating a reserve table comprising the number of screen rows for displaying lines of text on the screen and a total number of lines of text of the file; (d) assigning each line of text of the file to a screen row; and (e) displaying only entire lines of text which correspond to the screen rows of the screen.

Preferably, in step (a) the number of screen rows on the display screen is determined by the font size of the lines of text of the file. Upon scrolling forward the lines of text in the file, step (d) preferably comprises assigning each line of text scrolled forward to a screen row. Likewise, upon scrolling backward the lines of text in the file, step (d) preferably comprises assigning each line of text scrolled backward to a screen row.

In still yet another aspect, the present invention is directed to a method of formatting a hypertext markup language file comprising the steps of: (a) accessing a hypertext markup language file on a computer, the file having one or more hypertext markup language tags; (b) determining a total number of lines of text in the file by locating the tags; and (c) assigning each line of text to a screen row on a display screen such that upon viewing the file, only entire lines of text will be displayed as determined by the number of screen rows on the screen.

In a further aspect, the present invention is directed to a program storage device readable by a machine, tangibly embodying a program of instructions executable by the machine to perform method steps for a method of viewing a hypertext markup language file on a computer linked to a display screen with an adjustable number of screen rows for displaying lines of text on the screen, the method steps comprising: (a) accessing a hypertext markup language file containing lines of text; (b) determining a total number of lines of text in the file; and (c) viewing a portion of the total number of lines of text in the file, the portion having lines of text assigned to the screen rows of the screen such that only entire lines of text are displayed on the screen.

In yet a further aspect, the present invention is directed to a program storage device readable by a machine, tangibly embodying a program of instructions executable by the machine to perform method steps for a method of viewing a hypertext markup language file containing text on a display screen having an adjustable number of screen rows for displaying lines of text, the method steps comprising: (a) accessing a hypertext markup language file for viewing on the screen; (b) creating a reserve table, the table having the number of screen rows written thereon; (c) formatting the file by locating hypertext markup language tags within the file to determine the number of lines of text in the file; (d) writing the number of lines of text in the file to the reserve table; (e) assigning, within the reserve table, the lines of text in the file to the screen rows; (f) reading the reserved table to determine which of the lines of text in the file is to be viewed on the screen; (g) writing the lines of text assigned to the screen rows to the screen; and (h) displaying only entire lines of text on the screen.

In yet a further aspect, the present invention is directed to a program storage device readable by a machine, tangibly embodying a program of instructions executable by the machine to perform method steps for a method of browsing a web site utilizing a web browser linked to a display screen having an adjustable number of screen rows, the method steps comprising: (a) engaging the web browser and accessing a web site; (b) accessing a hypertext markup language file on the web site; (c) assigning absolute row numbers to the file, the row numbers corresponding to the lines of text within the file; and (d) displaying the absolute row numbers which correspond to the screen rows on the display screen such that only entire lines of text are displayed.

In still yet a further aspect, the present invention is directed to a program storage device readable by a machine, tangibly embodying a program of instructions executable by the machine to perform method steps for a method of creating and utilizing a reserve table on a computer with a display screen having a number of screen rows, the method steps comprising: (a) accessing a hypertext markup language file for display on the screen; (b) creating a reserve table comprising the number of screen rows for displaying lines of text on the screen and a total number of lines of text of the file; (c) assigning each line of text of the file to a screen row; and (d) displaying only entire lines of text which correspond to the screen rows of the screen.

In a final aspect, the present invention is directed to a program storage device readable by a machine, tangibly embodying a program of instructions executable by the machine to perform method steps for a method of formatting a hypertext markup language file, the method steps comprising: (a) accessing a hypertext markup language file on a computer, the file having one or more hypertext markup language tags; (b) determining a total number of lines of text in the file by locating the tags; and (c) assigning each line of text to a screen row on a display screen; and (d) displaying only entire lines of text as determined by the number of screen rows on the screen.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 2 is an illustration of the display screen of FIG. 1 after a user has scrolled forward in viewing the html file.

FIG. 4 is an illustration of the display screen of FIG. 3 after a user has scrolled forward in viewing the html file.

DESCRIPTION OF THE PREFERRED EMBODIMENT(S)

In describing the preferred embodiment of the present invention, reference will be made herein to FIGS. 1–7 of the drawings in which like numerals refer to like features of the invention. Features of the invention are not necessarily shown to scale in the drawings.

The present invention provides a method and apparatus for correctly positioning text on a display screen linked to a computer such that the text of an html file containing text is displayed with only entire lines of text and without the re-display of text that was displayed on a previous screen. By correctly positioning the text on the display screen, even when the user scrolls the text backwards and forwards, only entire lines of text are displayed which makes reading the text on the screen much more user friendly. When scrolling the text forward, the present invention will not display the partial line of text on the screen currently being viewed, but will display the entire line of text on the next screen to be viewed. If the partial line of text is at the bottom of the screen, then the text will appear instead at the top of the next screen. When the text is scrolled backward, the present invention resolves the situation in the same way but in the opposite direction.

Figure 3:
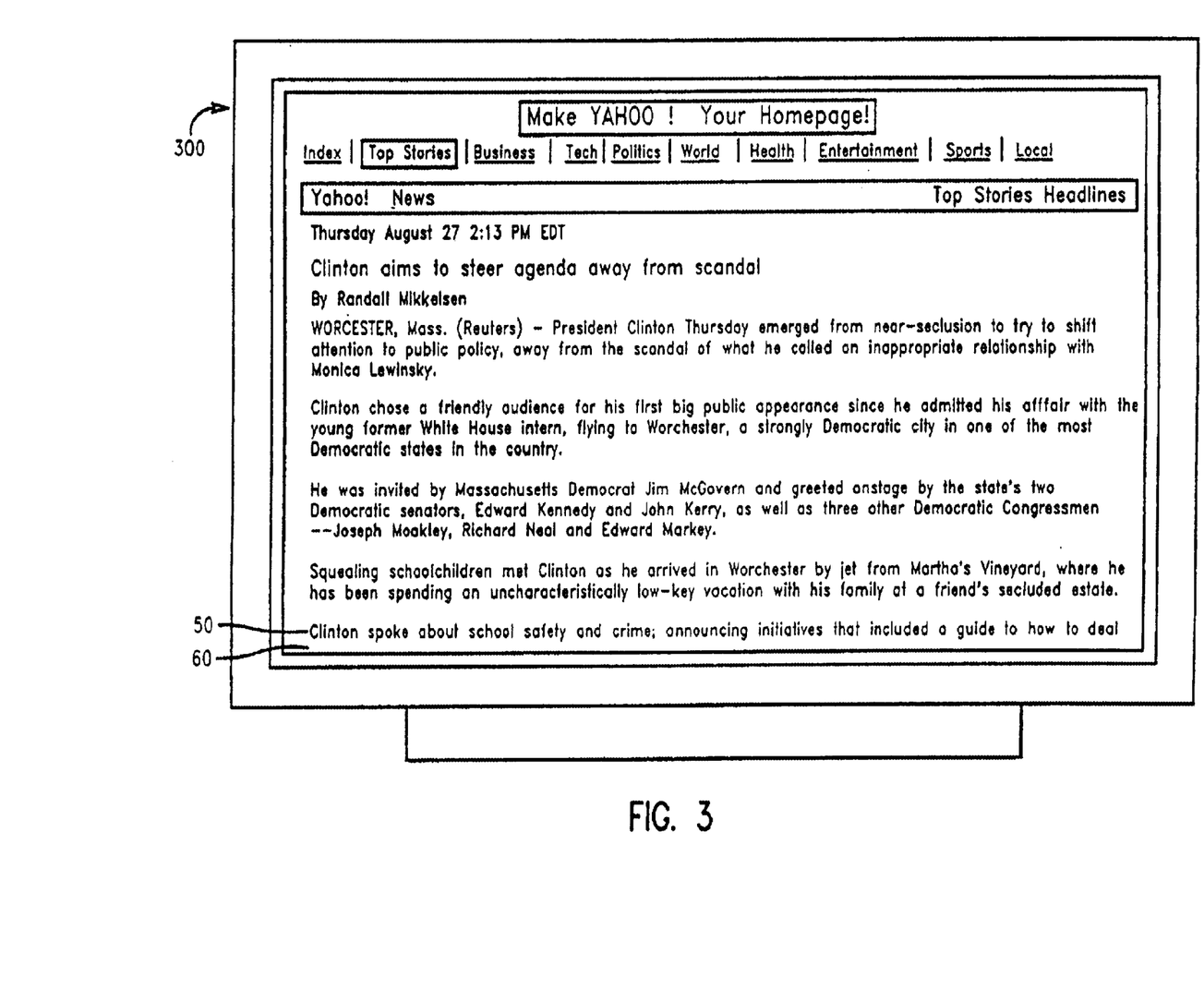
FIG. 3 is an illustration of a display screen linked to a computer displaying an html file accessed and viewed by the methods and apparatus of the present invention.
Figure 3A:
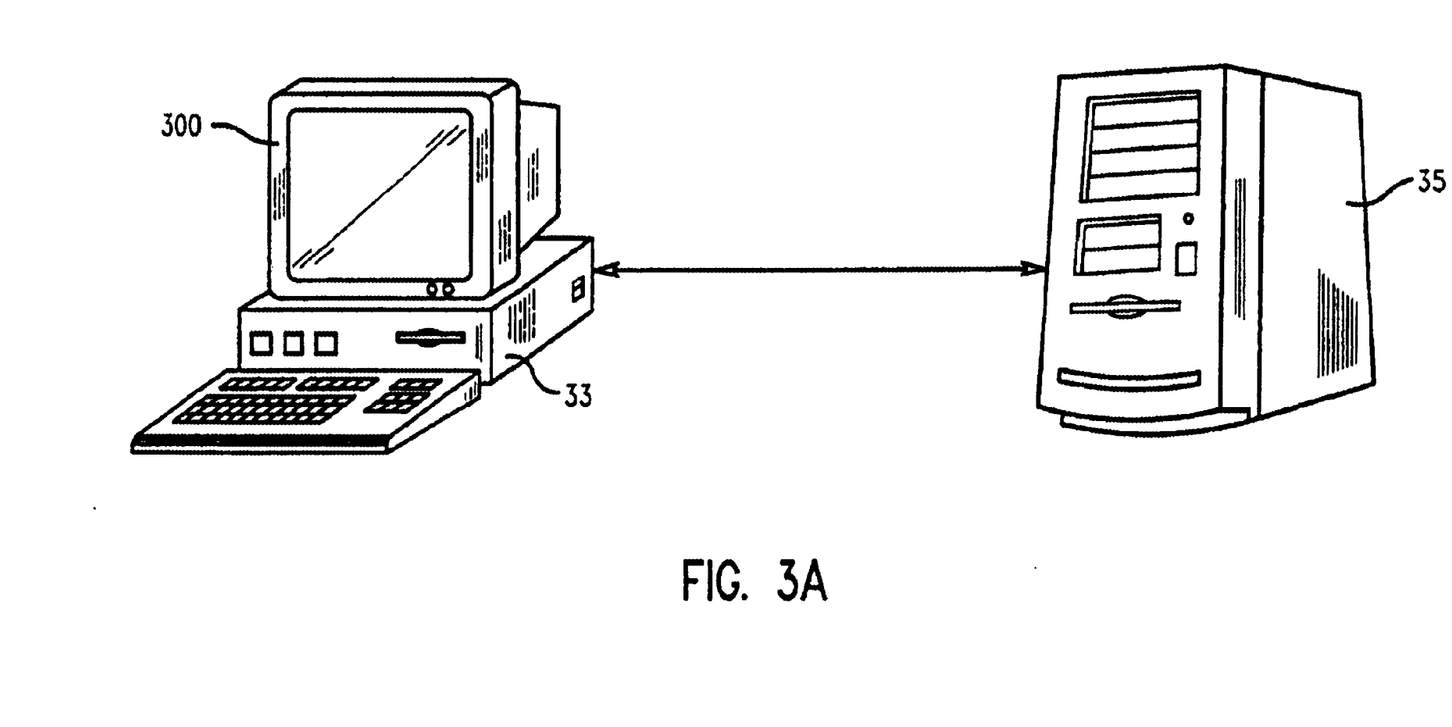
FIG. 3A is schematic representation of how the user computer may be linked to a server to access an html file.

In accordance with the present invention, FIG. 3 shows the text of an html file correctly displayed such that only entire lines of text are shown on screen 300. Screen 300 is linked to a computer 33 which in turn is linked to a server 35, either a local server as part of an internal network such as a local area network (LAN) or to a remote server as part of an external network such as the Internet, as schematically represented in FIG. 3A. Screen 300 has a predetermined number of screen rows for displaying text. The screen rows are determined by the font type and size of the text to be displayed. Thus, when displaying text in a regular format in a 24 point font, the number of screen rows will be fewer than when displaying text in a 12 point font.

Preferably, a web browser programmed in accordance with the present invention and stored in the random access memory of the user's computer may be used to access a web site which contains html files. Typically, the html files contain a combination of lines of text with graphics, or text alone, wherein html tags are located throughout the file to indicate the location of the text or graphics within the file. The html file has a fixed number of lines which will be referred to as the "absolute row numbers" representing the line numbers of each row of the html file. The absolute row numbers start at number 1 and proceed in sequence to the end of the html file.

Upon accessing the web site and selecting a file, the text of the html file appears on screen 300. The line of text 50 is correctly and entirely displayed as the last line of text displayable on screen 300. In contrast, looking back to FIG. 1, the line of text 10 is the last line completely displayed with the following line 20 being only partially displayed, thus, making reading difficult for the user. Referring back to FIG. 3, the absence of any partially displayed lines of text should be noted as an advantage over the prior art illustrated in FIG. 1. As such, 60 denotes the white or blank space where the partially displayed line was in FIG. 1.

Upon scrolling the text forward, FIG. 4 illustrates how the text is displayed on screen 300. The line of text 70 which follows line 50 is fully displayed at the top of screen 300 without any partial displays of text at the bottom of the screen. Contrast the positioning of line of text 70 with line of text 20 in FIGS. 1 and 2. In FIGS. 1 and 2, the partially displayed line of text 20 is re-displayed in its entirety along with the preceding line of text, although the preceding line was fully displayed previously which may cause confusion for the user. As illustrated in FIG. 4, the present invention does not require the re-display of line 50 as the lines of text being viewed are correctly positioned on the screen.

Figure 5:
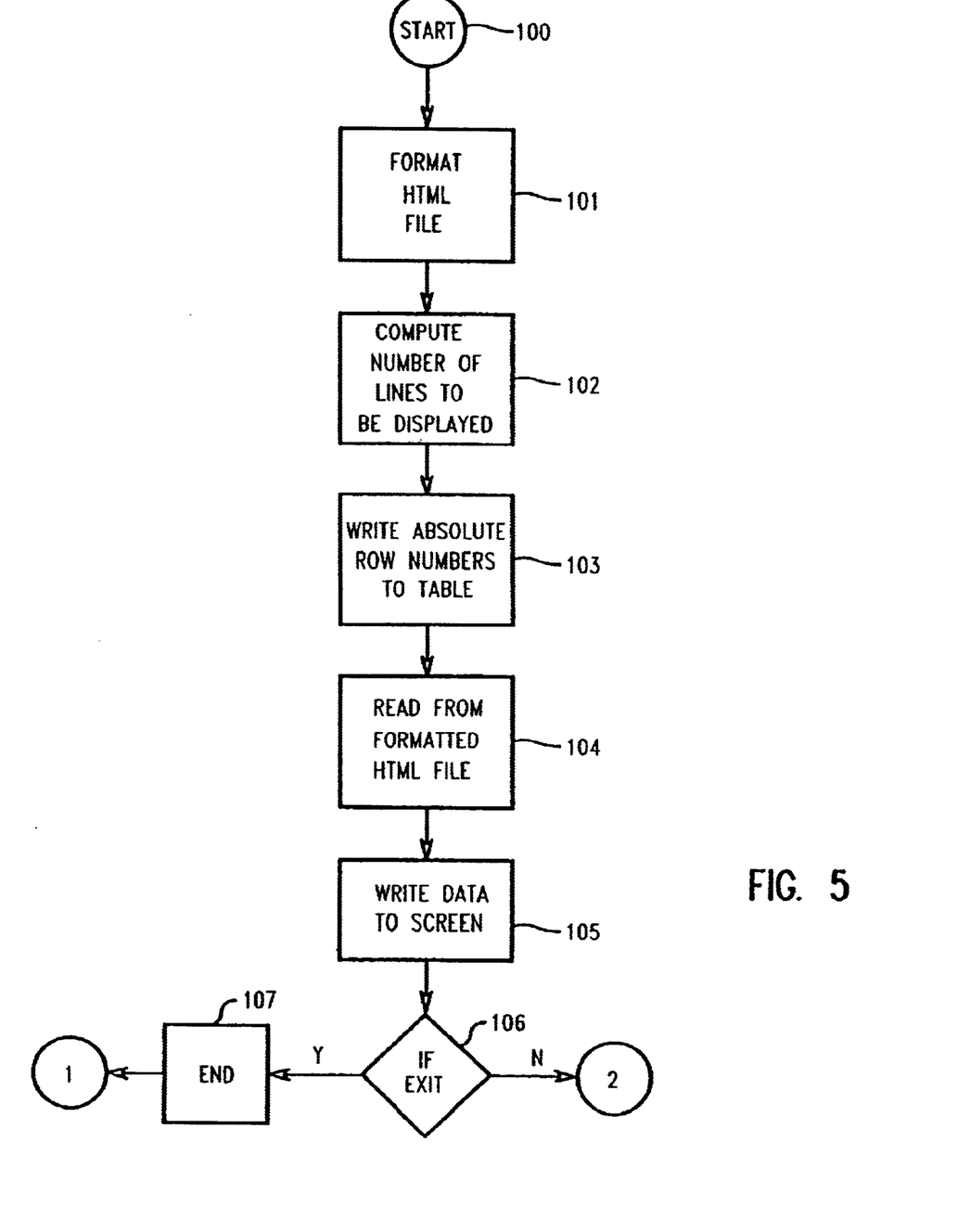
FIG. 5 is a flow diagram illustrating the process steps of accessing and viewing an html file in accordance with the present invention.
Figure 6:
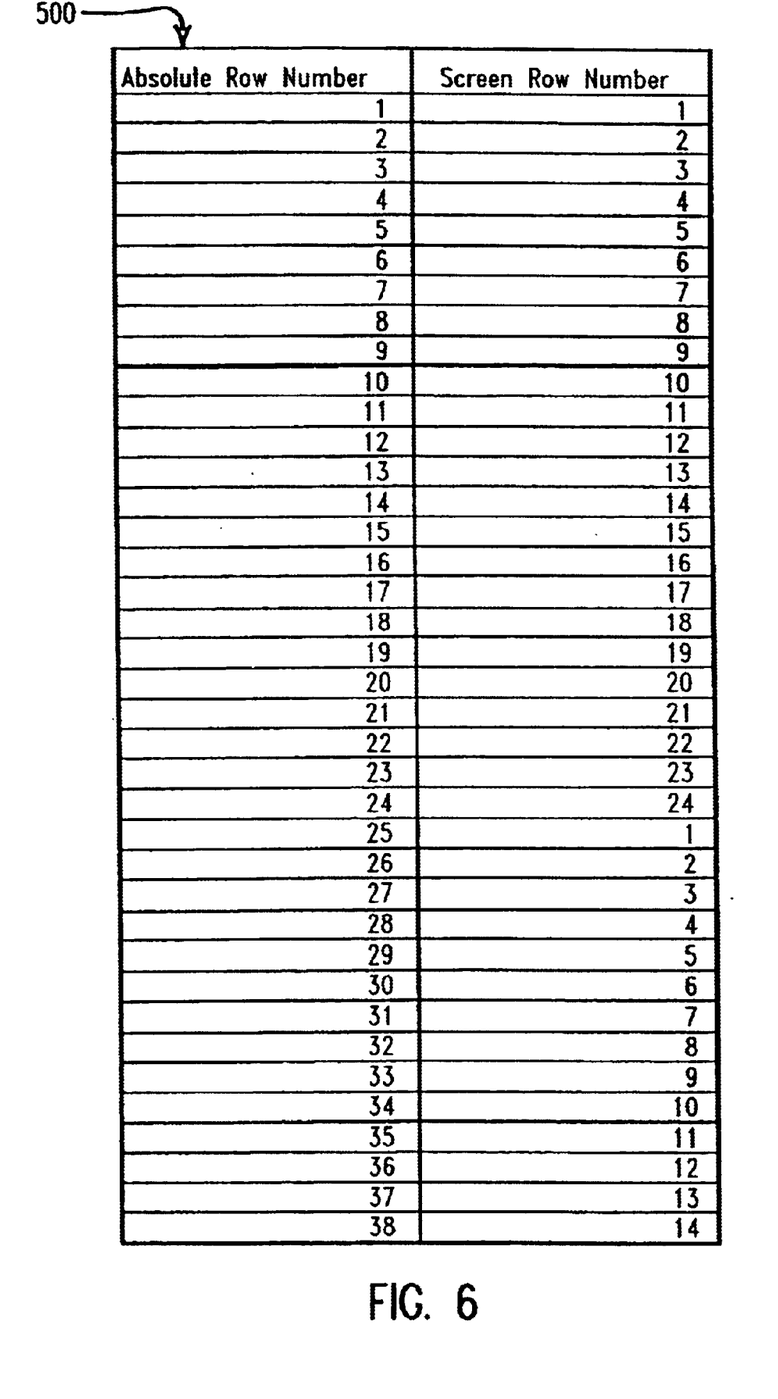
FIG. 6 is an illustration of a reserve table of the present invention for storing the absolute row numbers representing the lines of text in an html file, and the screen row numbers corresponding to the number of displayable lines of text to be displayed on the screen.

The present invention accomplishes the correct positioning of the html text by having the web browser check the location of text to be displayed on the screen prior to presenting the text to the user. When the condition occurs that would display a partial line of the text on the top and or bottom of the web browser screen, the present invention repositions the text that is to be presented to the web browser. FIGS. 5 and 6 are flow diagrams which illustrate the methodology of the present invention.

In FIG. 5, a user begins the process 100 by engaging the web browser stored on the user computer to access a web site containing html files. Once the html source file is located, the source file is formatted 101. The screen rows are then computed 102 according to the font type and size of the text. A reserve table is created upon which the necessary display information will be written including the absolute row numbers of the html file and the screen row numbers.

For example, as illustrated in FIG. 6, when the html file contains 38 lines of text, the reserve table would contain 38 absolute row numbers representing each line of the html file. Thus, row numbers 1 to 38 are written 103 onto the reserve table 500. Depending on the font type and size, each absolute row number is matched with a screen row. Thus, for a screen containing 24 screen rows for displaying 24 lines of text, each absolute row number is assigned to a screen row number such that a maximum of 24 lines of text in the html file will be fully displayed on the screen without any partial lines of text being displayed at all. Upon accessing the reserve table by the web browser, the lines of text will be read 104 from the formatted html file to determine which screen row corresponds to the particular line of text from the file and on which screen row number the line will appear on the screen. The data from the reserve table is written 105 onto the screen so that the lines of text corresponding to the absolute row numbers are written to the screen at the designated screen rows indicated by the reserve table.

Figure 7:
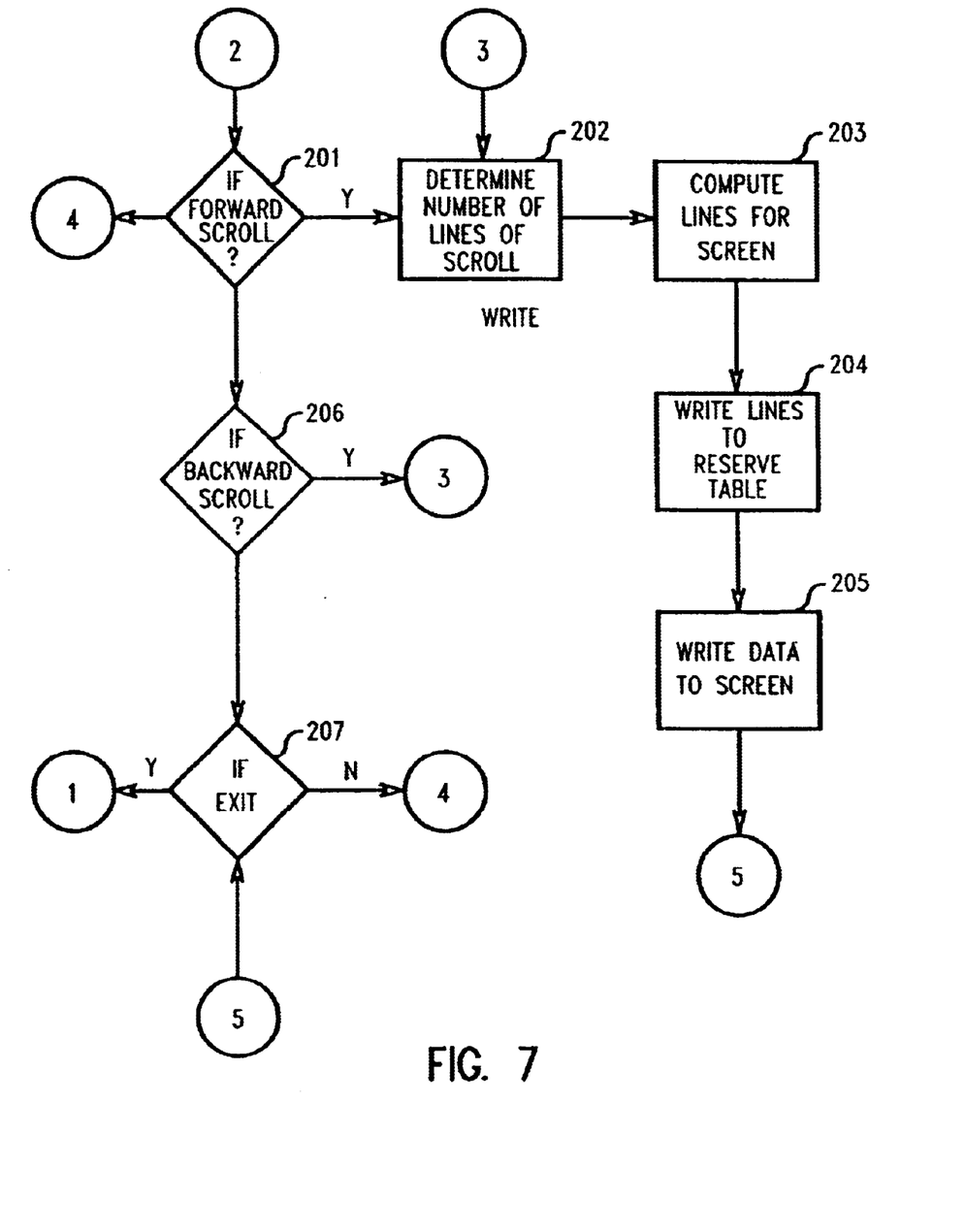
FIG. 7 is a flow diagram illustrating the process steps of backward and forward scrolling the text within the html file when viewing the html file in accordance with the present invention.

Once the text displayed on the screen has been viewed by the user, the user determines whether to exit 106 the program, upon which the process ends 107, or view the remaining text of the file. FIG. 7 illustrates the methodology used when the user scrolls the text forward or backward when continuing to view the file. When the user issues a scroll command, it is determined 201 whether a forward scroll command has been issued or a backward scroll command has been issued.

When the forward scroll command is issued, the number of lines scrolled must be determined 202 by the web browser. The lines of text which will be written to the screen are computed 203 from the scrolled text depending on the number of screen row numbers which is again dictated by the font type and size of the text. The absolute row numbers of the scrolled text are then written 204 to the reserve table and a screen row number assigned to each line of scrolled text. Each line of text is written 205 to the screen in accordance with the absolute row numbers representing each line of scrolled text and displayed at the corresponding screen row. If the end of the html file has been reached or the user decides not to continue viewing the file, the process may be exited 207 at this juncture. However, when the backward scroll command has been issued 206, the process begins again at step 202 and the lines of text are computed and written to the screen for display.

The present invention achieves the objects recited above. The method and apparatus of the present invention formats the html file such that the web browser displays only entire rows of text and wherein partial lines of text are non-displayable. The present invention determines the number of lines of text in the html file and assigns each line of text to a screen row for display on the screen. Even when the user issues a scroll command, either backward or forward, the lines of text are again correctly positioned and there is no re-display of text viewed on a previous screen nor display of partial lines of text.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of viewing a hypertext markup language file containing text comprising the steps of:

providing a computer linked to a display screen with an adjustable number of screen rows for displaying lines of text on the screen;

accessing a hypertext markup language file containing lines of text;

determining a total number of lines of text in said file;

creating a reserve table;

writing the number of screen rows and the total number of lines of text in said file to the reserve table;

assigning within the reserve table the lines of text in the file to the screen rows; and viewing a portion of the total number of lines of text in said file assigned to the screen rows of the screen such that only entire lines of text are displayed on the screen therein ensuring that said lines of text are complete vertically.

2. The method of claim 1 wherein step (g) further includes the steps of:

reading said reserved table to determine which of the lines of text in said file corresponding to the screen rows is to be viewed on the screen; and writing the lines of text determined from the reserve table to the screen rows for viewing.

3. The method of claim 1 further including the step of forward scrolling said file.

4. The method of claim 4 wherein said of foward scrolling said file includes the steps of:

determining the number of lines of text scrolled forward;

determining the number of lines of text scrolled forward to be written to the screen;

assigning the lines of text to the screen rows; and writing the lines of text to the screen such that only entire lines of text that are complete vertically are displayed on the screen.

5. The method of claim 1 further including the step of backward scrolling said file.

6. The method of claim 5 wherein said step of backward scrolling said file further includes the steps of:

determining the number of lines of text scrolled backward;

determining the number of lines of text scrolled backward to be written to the screen;

assigning the lines of text to the screen rows; and writing the lines of text to the screen such that only entire lines of text that are complete vertically are displayed on the screen.

7. The method of claim 1 wherein step (c) comprises determining a total number of lines of text in said file by locating hypertext markup language tags in said file, said tags indicating a beginning and an end of said file.

8. A method of viewing a hypertext markup language file containing text comprising the steps of:

providing a computer linked to a display screen having an adjustable number of screen rows for displaying lines of text;

accessing a hypertext markup language file for viewing on the screen;

creating a reserve table, said reserve table having the number of screen rows written thereon;

formatting said file by locating hypertext markup language tags within said file to determine the number of lines of text in said file;

writing the number of lines of text in said file to said reserve table;

assigning, within said reserve table, the lines of text in said file to the screen rows;

reading said reserved table to determine which of the lines of text in said file is to be viewed on the screen;

writing the lines of text assigned to the screen rows to the screen; and displaying only entire lines of text that are complete vertically on the screen such that re-display of text that was displayed on a previous screen is avoided.

9. The method of claim 8 wherein during step (i) partial lines of text are non-displayable on a currently viewed screen, whereby entire lines of said non-displayable partial lines of text are displayed on a next viewed screen.

10. The method of claim 8 further including the steps of:
forward scrolling said file;
determining the number of lines of text scrolled forward;
determining the number of lines of text scrolled forward to be written to the screen;
assigning the lines of text to the screen rows; and
writing the lines of text to the screen such that only entire lines of text that are complete vertically are displayed.

11. The method of claim 8 further including the steps of:
backward scrolling said file;
determining the number of lines of text scrolled backward;
determining the number of lines of text scrolled backward to be written to the screen;
assigning the lines of text to the screen rows; and
writing the lines of text to the screen such that only entire lines of text that are complete vertically are displayed.

12. A method of browsing a web site comprising the steps of:
providing a web browser linked to a display screen having an adjustable number of screen rows;
engaging the web browser and accessing a web site;
accessing a hypertext markup language file on the web site;
assigning absolute row numbers to said file, said row numbers corresponding to the lines of text within said file;
creating a reserve table;
writing the number of screen rows and the absolute row numbers to the reserve table;
assigning within the reserve table said absolute row numbers that correspond to the screen rows; and
displaying said absolute row numbers which correspond to the screen rows on the display screen such that only entire lines of text are displayed on the screen therein ensuring that said lines of text are complete vertically.

13. The method of claim 12 further including, prior to step (e), the step of reading said reserve table to determine the lines of text in said hypertext markup language file to be displayed on the display screen.

14. The method of claim 12 further including the steps of:
forward scrolling said file;
determining the number of lines of text scrolled forward;
determining the number of lines of text scrolled forward to be written to the screen;
assigning the lines of text to the screen rows; and
writing the lines of text to the screen such that only entire lines of text that are complete vertically are displayed.

15. The method of claim 12 further including the steps of:
backward scrolling said file;
determining the number of lines of text scrolled backward;
determining the number of lines of text scrolled backward to be written to the screen;
assigning the lines of text to the screen rows; and
writing the lines of text to the screen such that only entire lines of text that are complete vertically are displayed.

16. A method of creating and utilizing a reserve table comprising the steps of:
providing a computer with a display screen having a number of screen rows, said computer having access to a hypertext markup language file;
selecting the file for display on the screen;
creating a reserve table comprising the number of screen rows for displaying lines of text on the screen and a total number of lines of text of the file;
assigning each line of text of the file to a screen row; and
displaying only entire lines of text which correspond to the screen rows of the screen therein ensuring that said lines of text are complete vertically.

17. The method of claim 16 wherein in step (a) the number of screen rows on the display screen is determined by font size of the lines of text of the file.

18. The method of claim 16 wherein upon scrolling forward the lines of text in the file, step (d) comprises assigning each line of text scrolled forward to a screen row.

19. The method of claim 16 wherein upon scrolling backward the lines of text in the file, step (d) comprises assigning each line of text scrolled backward to a screen row.

20. A method of formatting a hypertext markup language file comprising the steps of:
accessing a hypertext markup language file on a computer, said file having one or more hypertext markup language tags;
determining a total number of lines of text in said file by locating the tags;
assigning each line of text to a screen row on a display screen; and
writing the number of lines of text in said file corresponding to the screen rows to a reserve table such that upon viewing said file, only entire lines of text that are complete vertically will be displayed as determined by the number of screen rows on the screen therein avoiding re-display of text that was displayed on a previous screen.

21. A program storage device readable by a machine, tangibly embodying a program of instructions executable by the machine to perform method steps for a method of viewing a hypertext markup language file on a computer linked to a display screen with an adjustable number of screen rows for displaying lines of text on the screen, said method steps comprising:

accessing a hypertext markup language file containing lines of text;

determining a total number of lines of text in said file;

creating a reserve table adapted to contain the number of screen rows and the total number of lines of text in said file;

assigning the lines of text in said file to the screen rows;

writing the number of lines of text in said file to said reserve table to correspond to the screen rows; and displaying a portion of the total number of lines of text in said file, said portion having lines of text assigned to the screen rows of the screen such that only entire lines of text that are vertically complete are displayed on the screen.

22. A program storage device readable by a machine, tangibly embodying a program of instructions executable by the machine to perform method steps for a method of viewing a hypertext markup language file containing text on a display screen having an adjustable number of screen rows for displaying lines of text, said method steps comprising:

accessing a hypertext markup language file to be displayed on the screen;

creating a reserve table, said table having the number of screen rows written thereon;

formatting said file by locating hypertext markup language tags within said file to determine the number of lines of text in said file;

writing the number of lines of text in said file to said reserve table;

assigning, within said reserve table, the lines of text in said file to the screen rows;

reading said reserved table to determine which of the lines of text in said file is to be viewed on the screen;

writing the lines of text assigned to the screen rows to the screen; and displaying only entire lines of text that are vertically complete on the screen therein avoiding re-display of text that was displayed on a previous screen.

23. A program storage device readable by a machine, tangibly embodying a program of instructions executable by the machine to perform method steps for a method of browsing a web site utilizing a web browser linked to a display screen having an adjustable number of screen rows, said method steps comprising:

engaging a web browser and accessing a web site;

accessing a hypertext markup language file on the web site;

assigning absolute row numbers to said file, said row numbers corresponding to the lines of text within said file;

creating a reserve table adapted to contain the number of screen rows and the total number of lines of text in said file;

assigning the lines of text in said file to the screen rows;

writing the number of lines of text in said file to said reserve table to correspond to the screen rows; and displaying said absolute row numbers which correspond to the screen rows on the display screen such that only entire lines of text are displayed on the screen therein ensuring that said lines of text are complete vertically.

24. A program storage device readable by a machine, tangibly embodying a program of instructions executable by the machine to perform method steps for a method of creating and utilizing a reserve table on a computer with a display screen having a number of screen rows, said computer having access to a hypertext markup language file, said method steps comprising:

accessing a hypertext markup language file to be displayed on the screen;

creating a reserve table comprising the number of screen rows for displaying lines of text on the screen and a total number of lines of text of the file;

assigning each line of text of the file to a screen row; and displaying only entire lines of text corresponding to the screen rows of the screen therein ensuring that said lines of text are complete vertically and avoiding re-display of text that was displayed on a previous screen.

25. A program storage device readable by a machine, tangibly embodying a program of instructions executable by the machine to perform method steps for a method of formatting a hypertext markup language file, said method steps comprising:

accessing a hypertext markup language file, said file having one or more hypertext markup language tags;

determining a total number of lines of text in said file by locating the tags;

assigning each line of text to a screen row on a display screen; and writing the number of lines of text in said file corresponding to the screen rows to a reserve table such that upon viewing said file only entire lines of text that are complete vertically as determined by the number of screen rows on the screen are displayed therein avoiding re-display of text that was displayed on a previous screen.

26. A computer program product comprising:

a computer usable medium having computer readable program code means embodied therein for causing a hypertext markup language file on a computer linked to a display screen to be viewed, the screen having an adjustable number of screen rows for displaying lines of text on the screen, said computer program product having:

computer readable program code means for causing said computer to access a hypertext markup language file to be displayed on the screen;

computer readable program code means for causing said computer to create a reserve table, said reserve table having the number of screen rows written thereon;

computer readable program code means for causing said computer to format said file by locating hypertext markup language tags within said file to determine the number of lines of text in said file;

computer readable program code means for causing said computer to write the number of lines of text in said file to said reserve table;

computer readable program code means for causing said computer to assign, within said reserve table, the lines of text in said file to the screen rows;

computer readable program code means for causing said computer to read said reserve table to determine which of the lines of text in said file is to be viewed on the screen;

computer readable program code means for causing said computer to write the lines of text assigned to the screen rows to the screen; and computer readable program code means for causing said computer to display only entire lines of text on the screen therein ensuring that said lines of text are complete vertically.

27. A computer program product comprising:

a computer usable medium having computer readable program code means embodied in said medium for causing a reserve table to be created and utilized on a computer with a display screen having a number of screen rows, said computer having access to a hypertext markup language file, said computer program product having:

computer readable program code means for causing a computer to access a hypertext markup language file to be displayed on the screen;

computer readable program code means for causing said computer to create a reserve table comprising the number of screen rows for displaying lines of text on the screen and a total number of lines of text of the file;

computer readable program code means for causing a computer to assign each line of text of the file to a screen row; and computer readable program code means for causing a computer to display only entire lines of text corresponding to the screen rows of the screen therein ensuring that said lines of text are complete vertical.

* * * * *